United States Patent
Sharique (10) Patent No.: US 11,379,485 B2
(45) Date of Patent: Jul. 5, 2022

(54) INFERRED PREDICATES FOR QUERY OPTIMIZATION

(71) Applicant: SAP SE, Walldorf (DE)

(72) Inventor: Muhammed Sharique, Camberley (GB)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/114,823

(22) Filed: Dec. 8, 2020

(65) Prior Publication Data
US 2022/0179854 A1  Jun. 9, 2022

(51) Int. Cl.
*G06F 16/2455* (2019.01)
*G06F 16/2453* (2019.01)
*G06F 16/215* (2019.01)
*G06F 16/22* (2019.01)

(52) U.S. Cl.
CPC ........ *G06F 16/2456* (2019.01); *G06F 16/215* (2019.01); *G06F 16/221* (2019.01); *G06F 16/2282* (2019.01); *G06F 16/24542* (2019.01)

(58) Field of Classification Search
CPC .. G06F 16/2456; G06F 16/215; G06F 16/221; G06F 16/2282; G06F 16/24542
See application file for complete search history.

(56) References Cited

U.S. PATENT DOCUMENTS

| | | | |
|---|---|---|---|
| 9,971,806 B2 * | 5/2018 | Hu | G06F 16/24545 |
| 10,776,368 B1 * | 9/2020 | Caragea | G06F 16/2462 |
| 2016/0350375 A1 * | 12/2016 | Das | G06F 16/24542 |
| 2017/0147647 A1 * | 5/2017 | Sen | G06F 16/24542 |
| 2019/0220464 A1 * | 7/2019 | Butani | G06F 16/283 |
| 2020/0272667 A1 * | 8/2020 | Ding | G06F 16/901 |
| 2021/0357406 A1 * | 11/2021 | Potharaju | G06F 16/221 |

* cited by examiner

*Primary Examiner* — Dangelino N Gortayo
(74) *Attorney, Agent, or Firm* — Buckley, Maschoff & Talwalkar LLC (57) ABSTRACT

A system includes reception of a query comprising a join operation on a first table and a second table and a join condition associated with the join operation, determination of a first table column of the first table and a second table column of the second table associated with the join condition, determination of an inferred predicate of the query, the inferred predicate associated with a first column dictionary of the first table column and a second column dictionary of the second table column, determination of a cost of using the inferred predicate to perform the join operation, determination of a plurality of query execution plans to execute the join operation using the inferred predicate, and determination of a cost of each of the plurality of query execution plans based on the cost of using the inferred predicate to perform the join operation.

20 Claims, 8 Drawing Sheets

| Empl. ID | Name |
|---|---|
| 10 | Sharique |
| 15 | Hemant |
| 21 | Maaz |
| 24 | Mary |
| 31 | Mary |
| 45 | Sharique |
| 46 | Sharique |

320

| Name | Country |
|---|---|
| Maaz | India |
| Sharique | Germany |
| Sharique | India |
| Maaz | Germany |

| Value | Token |
|---|---|
| Sharique | 1 |
| Hemant | 2 |
| Maaz | 3 |
| Mary | 4 |

420

| Name |
|---|
| 1 |
| 2 |
| 3 |
| 4 |
| 4 |
| 1 |
| 1 |

510

| Value | Token |
|---|---|
| Maaz | 1 |
| Sharique | 2 |

520

| Name |
|---|
| 1 |
| 2 |
| 2 |
| 1 |

| 1 | Sharique |
|---|----------|
| 2 | Hemant |
| 3 | Maaz |
| 4 | Mary |

INFERRED PREDICATES FOR QUERY OPTIMIZATION

BACKGROUND

A conventional database system utilizes a query processor to accept queries, devise a query execution plan, and execute the plan to produce desired results. The query processor includes a query optimizer to devise the query execution plan and an execution engine to execute the plan and acquire the results from database storage. More specifically, the query optimizer determines a number of candidate execution plans for a received query, estimates the cost of each plan and selects the plan with the lowest cost for execution.

Initially, the query optimizer creates a logical tree representing the query, in which each node of the tree represents a logical operation of the query. Logical operations may include, for example, reading a particular table or performing a join. The query optimizer generates a number of possible ways to execute the query, i.e. a number of possible execution plans, based on the logical tree. Each generated query execution plan is a set of physical operations (e.g., an index seek, a nested loop join) that can be performed to implement the logical operations of the logical tree.

The cost of a query execution plan may be determined based on the estimated resource use (e.g. I/O, CPU, and memory) of each physical operation of the plan. This estimation depends on the algorithm used by the physical operation and on the estimated number of records that will be processed by the physical operation. The number of records may be estimated using pre-stored optimizer statistics, which describe the distribution of values in one or more columns of a table.

A logical tree representing a query may include a join of two tables stored in column-store format. Improved query execution plans for such a logical tree are desired. Systems to estimate the cost of such improved query execution plans are also desired.

DETAILED DESCRIPTION

The following description is provided to enable any person in the art to make and use the described embodiments and sets forth the best mode contemplated for carrying out some embodiments. Various modifications, however, will be readily apparent to those in the art.

Some embodiments add inferred predicates to a join condition of a received query. The inferred predicates are added to the join condition to reduce the number of records input to the join operation. According to some embodiments, the inferred predicates are based on column dictionaries of dictionary-compressed columns of the join condition.

The modified query may be used to determine alternative query execution plans for the query, from which a query execution plan for the query may be selected. To facilitate this selection, also provided are systems to determine the cost to evaluate the inferred predicates, the selectivity of the inferred predicates and an estimated number of rows output by a join operation filtered by the inferred predicates.

Figure 1:
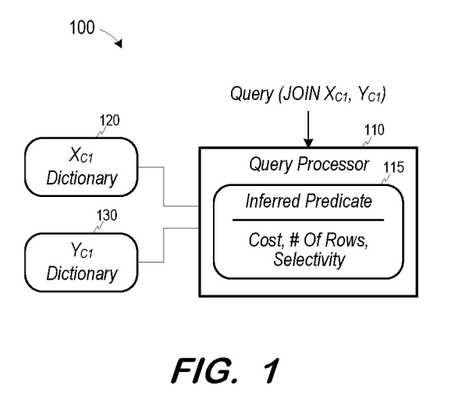
FIG. 1 is a block diagram of a system to determine and evaluate a query execution plan including an inferred predicate according to some embodiments.

FIG. 1 is a block diagram of system 100 according to some embodiments. The illustrated elements of system 100 may be implemented using any suitable combination of computing hardware and/or software that is or becomes known. System 100 may comprise components of a database system. In some embodiments, two or more elements of system 100 are implemented by a single computing device. One or more elements of system 100 may be implemented as a cloud service (e.g., Software-as-a-Service, Platform-as-a-Service).

Query processor 110 may comprise any suitable query processor that is or becomes known. Generally, query processor 110 receives a query from a client, determines a query execution plan to execute the query, executes the plan to produce a result set, and provides the result set to a client. As mentioned above, query processor 110 may include a query optimizer to determine a plurality of candidate query execution plans and to select a query execution plan from the candidate query execution plans based on calculated costs of each candidate query execution plan.

The candidate query execution plans may be determined based on a logical tree in which each node of the tree represents a logical operation of the query, with each candidate query execution plan implementing a different way to execute the logical operations of the logical tree. Candidate query execution plans may also be determined based on alternative logical trees representing modifications to the query. Some embodiments may operate to generate such an alternative logical tree, from which candidate query execution plans may be determined.

Query processor 110 of FIG. 1 receives a query which includes a join operation. Embodiments are not limited to a query including a single join operation. It will be assumed that the join operation joins a table X and a table Y, and that the join condition is based on a column $X_{C1}$ of table X and a column $Y_{C1}$ of table Y. In one non-exhaustive example, the query may be as follows: Select * from X, Y where $X_{C1}=Y_{C1}$.

As will be described below, and in order to determine a query execution plan for executing the received query, query processor 110 modifies the received query to add an inferred predicate to the join condition. Component 115 of query processor 110 includes program code and/or hardware to determine and add an inferred predicate as described herein.

In some examples, component 115 identifies the join operation of the incoming query, determines that the columns of the join condition are dictionary-compressed columns, and adds the inferred predicate based on the respective column dictionaries of the columns.

With respect to the above example, component 115 identifies the join condition $X_{C1}=Y_{C1}$ of the received query and determines that columns $X_{C1}$ and $Y_{C1}$ are dictionary-compressed columns. An inferred predicate is added to the query based on respective dictionaries 120 and 130 of columns $X_{C1}$ and $Y_{C1}$. The modified query may read as follows: Select * from X, Y where $X_{C1}=Y_{C1}$ and $X_{C1}$ in (IntersectList) and $Y_{C1}$ in (IntersectList). The array IntersectList is determined based on respective dictionaries 120 and 130 and its effect on the logical expression of the original query will be described in detail below.

In addition to the modified query, component 115 may provide associated optimization information to query processor 110. The associated information may include a selectivity of the inferred predicate, a cost for evaluating the inferred predicate, and a number of rows estimated to be processed by the join. The associated information may comprise these actual values or instructions for determining any one or more of the actual values.

Query processor 110 may determine one or more query execution plans based on the query as modified by the inferred predicate, and may determine a cost for each of these query execution plans based on the selectivity, cost, and estimated number of rows mentioned above. Query processor 110 may also determine one or more query execution plans based on the original query and respective costs thereof as is known in the art, which may further include the determination of one or more query execution plans and associated costs based on other modifications to the original query. Query processor 110 then selects a query execution plan from all of the determined query execution plans based on the respective costs.

Figure 2:
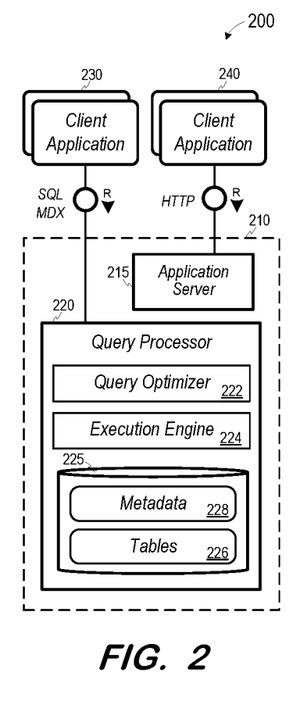
FIG. 2 is a block diagram of a database system according to some embodiments.

FIG. 2 is a block diagram of a database architecture which may utilize inferred predicates to determine query execution plans according to some embodiments. Embodiments are not limited to the FIG. 2 architecture.

Server node 200 may receive a query from one of client applications 230 and 240 and return results thereto based on data stored within server node 200. Node 200 executes program code to provide application server 215 and query processor 220. Application server 215 provides services for executing server applications. For example, Web applications executing on application server 215 may receive Hypertext Transfer Protocol (HTTP) requests from client applications 240 as shown in FIG. 2.

Query processor 220 may include stored data and engines for processing the data. Query processor 220 may also be responsible for processing Structured Query Language (SQL) and Multi-Dimensional eXpression (MDX) statements and may receive such statements directly from client applications 230.

Query processor 220 includes query optimizer 222 for use in determining query execution plans, for example as described herein, and execution engine 224 for executing query execution plans against tables 226 in storage 225. Query processor 220 may also include a statistics server (not shown) in some embodiments for determining statistics used to estimate query execution plan costs.

In some embodiments, the data of storage 225 may comprise one or more of conventional tabular data, row-stored data, column-stored data, and object-based data. Moreover, the data may be indexed and/or selectively replicated in an index to allow fast searching and retrieval thereof. Server node 200 may support multi-tenancy to separately support multiple unrelated clients by providing multiple logical database systems which are programmatically isolated from one another.

Metadata 228 includes data describing a database schema to which tables 226 confirm. Metadata 228 may therefore describe the columns and properties of tables 226, the properties of each column of each table 226, the interrelations between the columns, and any other suitable information. In one example, metadata 228 may identify one or more columns of tables 226 as dictionary-compressed and include information for locating the column dictionary and dictionary indices associated with each dictionary-compressed column.

Server node 200 may implement storage 225 as an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 3:
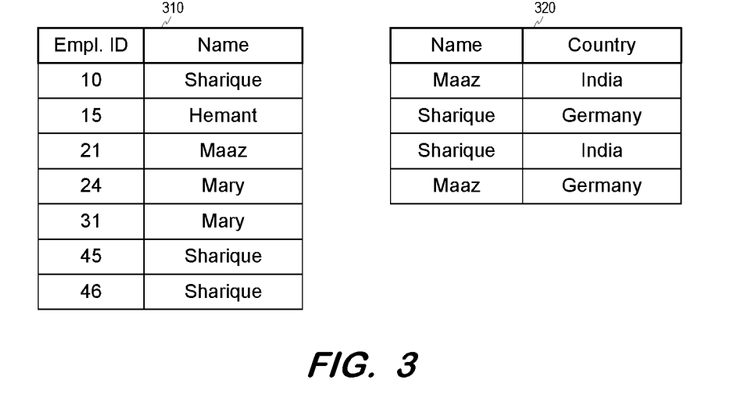
FIG. 3 includes tabular representations of two database tables according to some embodiments.

FIG. 3 includes tabular representations of database tables 310 and 320 for the purpose of describing dictionary compression according to some embodiments. It will be assumed that the Name column of table 310 and the Name column of table 320 are each to be stored in a dictionary-compressed format. Each of database tables 310 and 320 may include any number of rows and/or columns, and any number of the columns may be configured for storage in a dictionary-compressed format.

Figure 4:
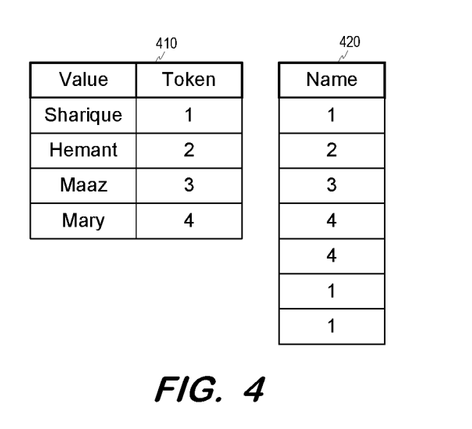
FIG. 4 includes a column dictionary and a corresponding dictionary-compressed column according to some embodiments.

As is known in the art, dictionary compression of a table column requires a column dictionary. FIG. 4 illustrates column dictionary 410 associated with the Name column of table 310. Column dictionary 410 associates a token with each unique value of the Name column of table 310.

Vector 420 is a representation of the values of the Name column of table 310 based on dictionary 410. As shown, each value of the Name column is substituted with the token of dictionary 410 which corresponds to the value. Since the tokens may be stored using fewer bits than the values, the memory storage occupied by vector 420 may be less than would be occupied by storing the values of the Name column shown in table 310, even considering the memory storage occupied by dictionary 410. Moreover, since some table columns to store repeating values, the corresponding tokens stored in vector 420 will similarly repeat, facilitating further compression of vector 420 using known data compression techniques.

Figure 5:
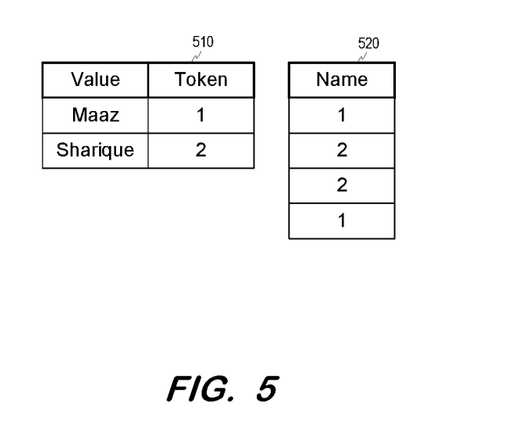
FIG. 5 includes a column dictionary and a corresponding dictionary-compressed column according to some embodiments.

Similarly, FIG. 5 illustrates column dictionary 510 associated with the Name column of table 320. Column dictionary 510 associates a token with each unique value of the Name column of table 320. Vector 520 includes a token representation of each value of each row of the Name column of table 320, based on the token-value associations of dictionary 510.

As an example of operation, when a new value is to be added to a row of the Name column of table 310, a storage engine may determine whether that value exists in column dictionary 410. If so, the token corresponding to that value is identified from dictionary 410 and the token is stored in the row. If not, a new entry is created in column dictionary 410 associating the value with a new token and the new token is stored in the row.

Figure 6:
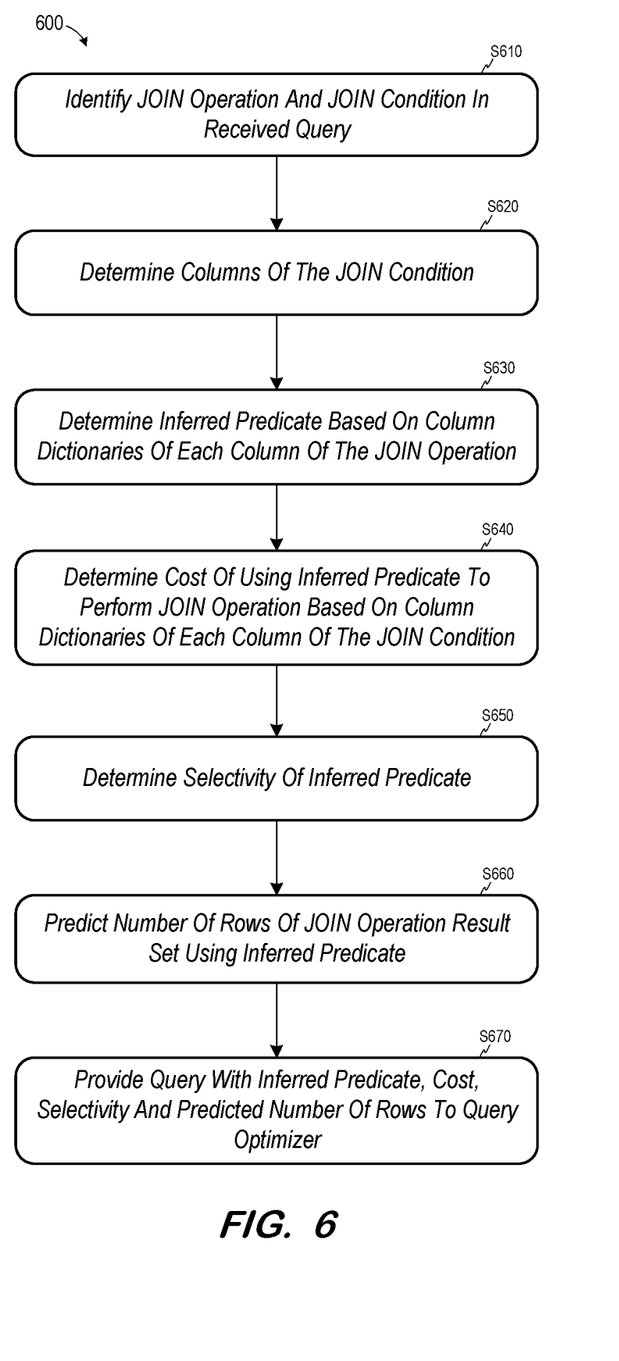
FIG. 6 comprises a flow diagram to determine and evaluate a query execution plan including an inferred predicate according to some embodiments.

FIG. 6 comprises a flow diagram of process 600 according to some embodiments. In some embodiments, various hardware elements of query processor 110 and/or server node 200 execute program code to perform process 600. Process 600 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

A query is received prior to process 600. The query may be received from any client application by any form of query processor. According to some embodiments, the query is received by a query optimizer of a Structured Query Language (SQL) server. The query may therefore comprise an SQL query, but embodiments are not limited thereto.

At S610, a join operation and associated join condition are initially identified in the received query. Process 600 terminates if no join operation is present in the received query. The join operation may specify two or more tables to be joined and the join condition may specify the columns on which the tables are to be joined. The present description will initially assume that the join operation specifies two tables to be joined but embodiments are not limited thereto.

Figure 7:
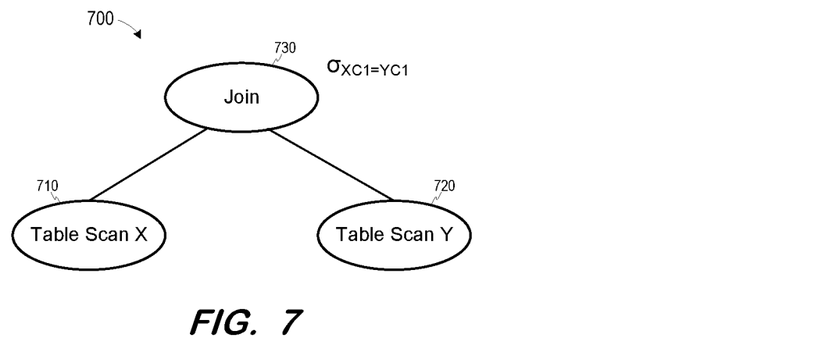
FIG. 7 is a logical tree representing logical operations of a query according to some embodiments.

In one example, the received query is Select * from X, Y where $X_{C1}==Y_{C1}$. The identified join operation is on tables X and Y and the identified join condition is $X_{C1}==Y_{C1}$. FIG. 7 illustrates logical tree 700 which represents the example query. Nodes 710 and 720 represent operations required in order to execute the join operation represented by node 730. Specifically, node 710 represents the logical operation of scanning table X in order to determine all values of all rows of column $X_{C1}$ and node 720 represents the logical operation of scanning table Y in order to determine all values of all rows of column $Y_{C1}$. Such table scanning is required in order to determine which rows of tables X and Y satisfy the join condition $X_{C1}==Y_{C1}$ and are to be joined by the operation of node 730.

Returning to process 600, the table columns of the join condition are determined at S620. In the present example, the determined table columns are $X_{C1}$ and $Y_{C1}$. Next, at S630, an inferred predicate is determined. Since only common values of $X_{C1}$ and $Y_{C1}$ will satisfy the join condition, the inferred predicate is based on the column dictionaries of each determined column of the join operation. As noted above, the inferred predicate may comprise two predicates: "$X_{C1}$ in (IntersectList)"; and "$Y_{C1}$ in (IntersectList)", where IntersectList is defined as Dictionary$_{XC1}$∩Dictionary$_{YC1}$. Taking dictionaries 410 and 510 as examples, Dictionary$_{410}$∩Dictionary$_{510}$={Sharique, Maaz}.

Figure 8:
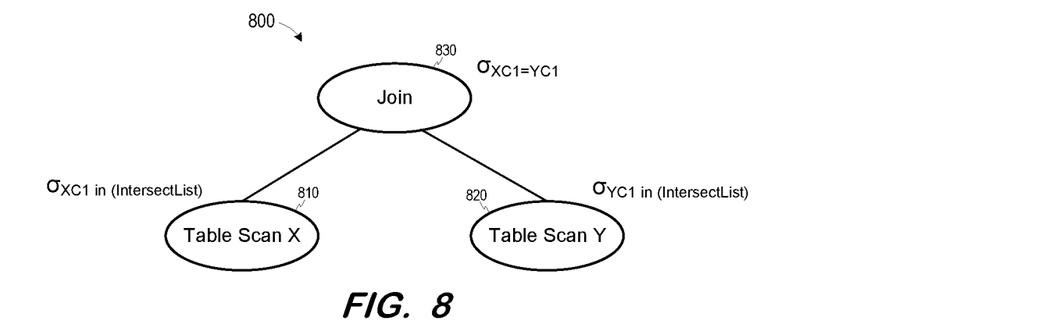
FIG. 8 is a logical tree representing revised logical operations of a query according to some embodiments.

Assuming such an inferred predicate, the received query becomes Select * from X, Y where $X_{C1}==Y_{C1}$ and $X_{C1}$ in (IntersectList) and $Y_{C1}$ in (IntersectList). FIG. 8 illustrates logical tree 800 which represents the query with the inferred predicate. Nodes 810 and 820 represent operations for applying the inferred predicate of the modified query. Node 810 represents the logical operation of scanning table X in order to determine all rows of column $X_{C1}$ which include a value in IntersectList and node 820 represents the logical operation of scanning table Y in order to determine all rows of column $Y_{C1}$ which include a value in IntersectList. By virtue of the filtering effect of nodes 810 and 820, the number of rows processed by node 830 may be fewer than those processed by node 730 of tree 700.

At S640, a cost of using the inferred predicate to perform the join operation is determined. The determination is based on the column dictionaries of each column of the join condition. In particular, the cost includes the cost of determining the IntersectList, which depends on the column dictionaries of each column of the join condition.

Figure 9:
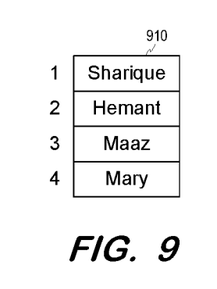
FIG. 9 illustrates a token-to-value index of a column dictionary according to some embodiments.
Figure 10:
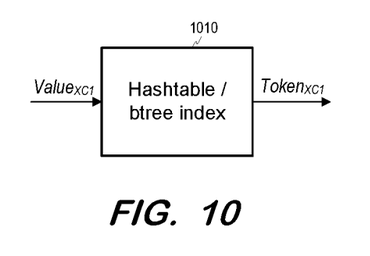
FIG. 10 illustrates a value-to-token index of a column dictionary according to some embodiments.

For purposes of describing determination of the IntersectList and the cost for doing so, FIGS. 9 and 10 illustrate two indices associated with a column dictionary according to some embodiments. In particular, structure 910 is an array of values representing a token-to-value (TV) index corresponding to column dictionary 410 of FIG. 4. The indices of the array correspond to the tokens of column dictionary 410. Accordingly, to determine a value of column dictionary 410 which is associated with a particular token, the token is used as an index to acquire a corresponding value from structure 910.

Index 1010 of FIG. 10 is a value-to-token (VT) index for a column dictionary according to some embodiments. Index 1010 is implemented by a hashtable, btree index or other suitable structure which is maintained based on changes to the column dictionary. As illustrated, a value of a column dictionary is input to the structure and a corresponding token is output.

S640 includes determination of the cost of determining the IntersectList of the inferred predicate. The following pseudocode represents an algorithm for determination of IntersectList=Dictionary$_{XC1}$∩Dictionary$_{YC1}$ using TV index for Dictionary$_{XC1}$ and VT index of Dictionary$_{YC1}$.

```
For each value in TV_XC1
    If( VT_YC1.Exist(value) )
        IntersectList.Add(Value)
    End If
End For
```

Based on the above algorithm, the cost of determining IntersectList=scan cost for TV$_{XC1}$+(find cost in VT$_{YC1}$) *number of values in TV$_{XC1}$. In some embodiments, the find cost for a btree implementation of VT$_{YC1}$=log (Number of values in Dictionary $Y_{C1}$), while the find cost for a hashtable implementation of VT$_{YC1}$=1.

Alternatively, the algorithm may substitute TV index for Dictionary$_{XC1}$ with TV index for Dictionary$_{YC1}$ and VT index of Dictionary$_{YC1}$ with VT index of Dictionary$_{XC1}$. In this latter case, the cost of determining IntersectList=scan cost for TV$_{YC1}$+(find cost in VT$_{XC1}$)*number of values in TV$_{YC1}$.

The selectivity of the inferred predicate is determined at S650. The selectivity, as described above, may be used to determine the cost of an entire query execution plan generated to execute a query including the inferred predicate. Generally, and with reference to nodes 810 and 820 of FIG. 8, the selectivity $\sigma_{XC1\ in\ (IntersectList)}$=number of elements in IntersectList/number of values in Dictionary$_{XC1}$, while the selectivity $\sigma_{YC1}$ in (IntersectList)=number of elements in IntersectList/number of values in Dictionary$_{YC1}$. According to the present example, since IntersectList={Sharique, Maaz}, $\sigma_{XC1}$=2/4=0.5, while $\sigma_{YC1}$=2/2=1.

A number of rows of the join operation result set is predicted at S660 using the inferred predicate. In this regard, the number of duplicates (D_$X_{C1}$) of any given value in column $X_{C1}$ will be approximately equal to the cardinality of table X divided by the number of values in Dictionary$_{XC1}$. Similarly, for column $Y_{C1}$, the number of duplicates (D_$Y_{C1}$) of any given value in column $Y_{C1}$ will be approximately equal to the cardinality of table Y divided by the number of values in Dictionary$_{YC1}$. Accordingly, the total join output given by any unique value of column $X_{C1}$ or column $Y_{C1}$=D_$X_{C1}$*D_$Y_{C1}$. Since IntersectList includes all such unique values which might satisfy the join condition, the total number of rows output by the join operation may be predicted as D_$X_{C1}$*D_$Y_{C1}$*(Number of elements in IntersectList), or D_$X_{C1}$*D_$Y_{C1}$*IntersectList.Count( ). With respect to the present example, predicted number of output rows=(7/4)*(4/2)*(2)=7.

At S670, the query with inferred predicate, cost, selectivity and predicted number of rows are provided to a query optimizer. The query optimizer may use the provided information to determine candidate query execution plans and to determine a query execution plan from the candidate query execution plans. For example, a query optimizer may determine a first plurality of candidate query execution plans for executing the logical operations of logical tree 700 representing the received query and a second plurality of candidate query execution plans for executing the logical operations of logical tree 800 representing the received query as augmented by an inferred predicate as described above. A cost of each of the first plurality and second plurality of candidate query execution plans is determined, where the cost of the second plurality of candidate query execution plans may be determined based on the cost, selectivity and predicted number of rows determined by process 600. A single query execution plan is then determined for execution from the first plurality and second plurality of candidate query execution plans based on the determined costs.

The received query may include more than one join operation. In such a case, process 600 may be applied to each of any combination of the one or more of the join operations to determine candidate query execution plans and their associated costs. For example, if a received query includes a first, second and third join operations, process 600 may be executed independently with respect to the first and third join operations to determine a first inferred predicate, cost, selectivity and number of rows for the first join operation and a second inferred predicate, cost, selectivity and number of rows for the third join operation. A plurality of candidate query execution plans for executing the query (with the first and third join operations augmented by the first and second inferred predicates) may then be determined and evaluated based on the determined costs, selectivities and numbers of rows.

Similar logic may be applied to determine additional pluralities of candidate query execution plans for executing the query with the first and second join operations augmented by inferred predicates, with the second and third join operations augmented by inferred predicates, with only the first join operation augmented by an inferred predicate, with only the second join operation augmented by an inferred predicate, with only the third join operation augmented by an inferred predicate, and with none of the join operations augmented by an inferred predicate.

Figure 11:
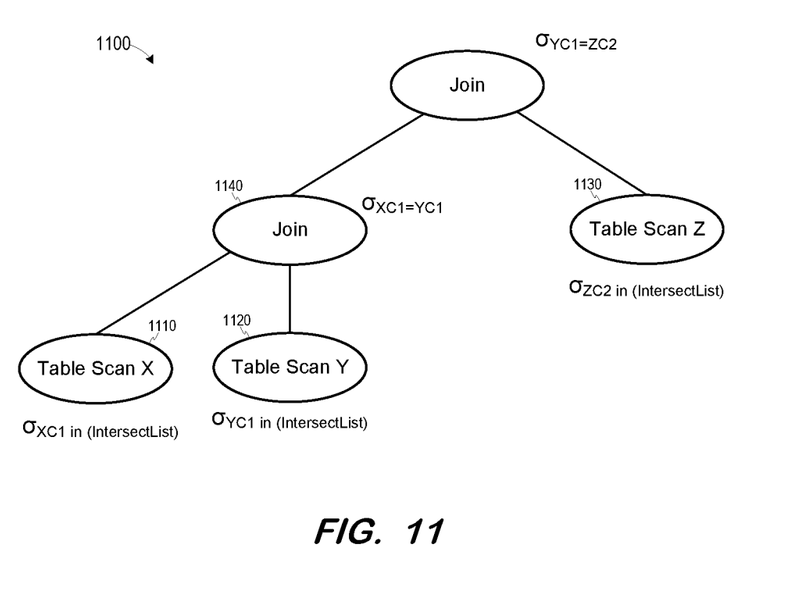
FIG. 11 is a logical tree representing revised logical operations of a query according to some embodiments.

A received query may include a join operation on more than two tables. For example, the query Select * from X, Y, Z where $X_{C1}$=$Y_{C1}$ and $Y_{C1}$=$Z_{C2}$ may be received, including join conditions $X_{C1}$=$Y_{C1}$ and $Y_{C1}$=$Z_{C2}$. FIG. 11 illustrates logical operation tree 1100 including inferred predicates "$X_{C1}$ in (IntersectList)"; "$Y_{C1}$ in (IntersectList)", and "$Z_{C2}$ in (IntersectList)". In this example, IntersectList may simply be computed as [Dictionary$_{XC1}$∩Dictionary$_{YC1}$]∩Dictionary$_{ZC2}$. and the above-described principles may be applied to determine the associated costs, selectivities and predicted number of rows.

Figure 12:
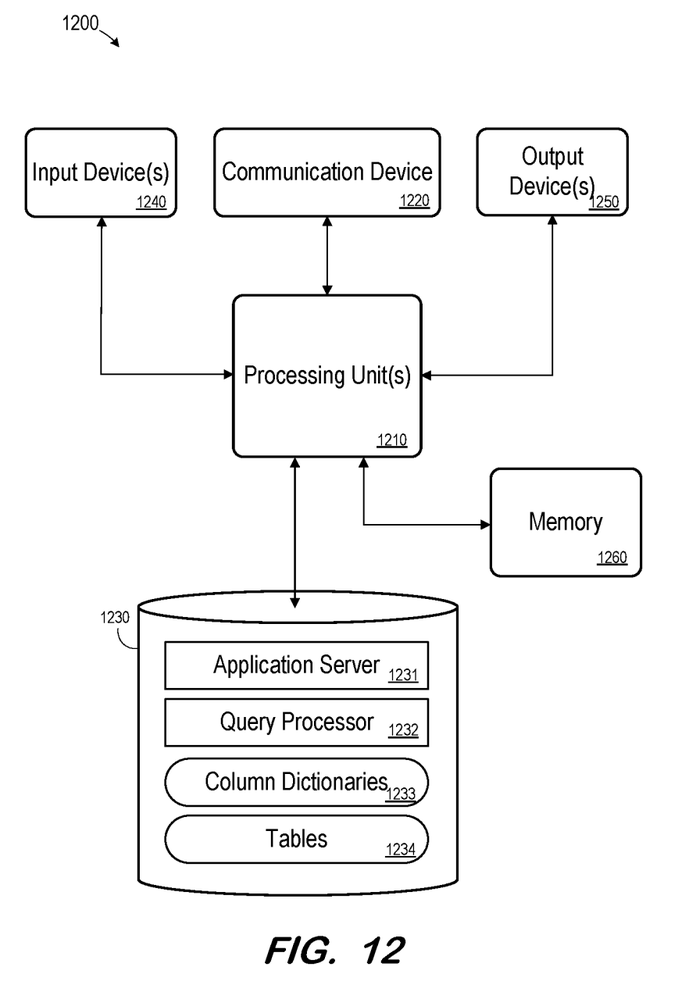
FIG. 12 is a block diagram of a database node according to some embodiments.

FIG. 12 is a block diagram of server node 1200 according to some embodiments. Server node 1200 may comprise a general-purpose computing apparatus and may execute program code to perform any of the functions described herein. Server node 1200 may comprise an implementation of server node 200 in some embodiments. Server node 1200 may include other unshown elements according to some embodiments.

Server node 1200 includes processing unit(s) 1210 operatively coupled to communication device 1220, data storage device 1230, one or more input devices 1240, one or more output devices 1250 and memory 1260. Communication device 1220 may facilitate communication with external devices, such as an external network or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Application server 1231 and query processor 1232 may each comprise program code executed by processor(s) 1210 to cause server 1200 to perform any one or more of the processes described herein. Such processes may include generating inferred predicates for received queries on tables 1234 and determining associated cost, selectivities and output rows based on corresponding column dictionaries 1233. Embodiments are not limited to execution of these processes by a single computing device. Data storage device 1230 may also store data and other program code for providing additional functionality and/or which are necessary for operation of server 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code in order to cause the system to:
receive a query comprising a join operation on a first table and a second table and a join condition associated with the join operation;
determine a first table column of the first table and a second table column of the second table associated with the join condition;
determine an inferred predicate of the query, the inferred predicate associated with a first column dictionary of the first table column and a second column dictionary of the second table column;
add the inferred predicate to the join condition based on the first column dictionary of the first table column and the second column dictionary of the second table column to modify the query;
determine a cost of using the inferred predicate to perform the join operation of the modified query;
determine a plurality of query execution plans to execute the join operation of the modified query using the inferred predicate; and
determine a cost of each of the plurality of query execution plans based on the cost of using the inferred predicate to perform the join operation of the modified query.

2. The system according to claim 1, the inferred predicate restricting the join operation of the modified query to values of the first table column which are present in both the first column dictionary and the second column dictionary, and to values of the second table column which are present in both the first column dictionary and the second column dictionary.

3. The system according to claim 2, wherein determination of the cost of using the inferred predicate to perform the join operation of the modified query comprises determination of a cost to determine values which are present in both the first column dictionary and the second column dictionary.

4. The system according to claim 2, the processing unit to execute the processor-executable program code in order to cause the system to:
determine a number of duplicates per value in the first table based on a cardinality of the first table and the number of values in the first column dictionary;
determine a number of duplicates per value in the second table based on a cardinality of the second table and the number of values in the second column dictionary; and
predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

5. The system according to claim 1, wherein determination of the cost of using the inferred predicate to perform the join operation of the modified query comprises determination of a cost to determine values which are present in both the first column dictionary and the second column dictionary.

6. The system according to claim 1, the processing unit to execute the processor-executable program code in order to cause the system to:
determine a number of duplicates per value in the first table based on a cardinality of the first table and the number of values in the first column dictionary;
determine a number of duplicates per value in the second table based on a cardinality of the second table and the number of values in the second column dictionary; and
predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

7. The system according to claim 1, the processing unit to execute the processor-executable program code in order to cause the system to:
determine a selectivity of the inferred predicate based on a number of values which are present in both the first column dictionary and the second column dictionary, a number of values in the first column dictionary, and a number of values in the second column dictionary.

8. A computer-implemented method comprising:
receiving a query comprising a join operation on a first table and a second table and a join condition associated with the join operation;
determining a first table column of the first table and a second table column of the second table associated with the join condition;
determining an inferred predicate of the query, the inferred predicate associated with a first column dictionary of the first table column and a second column dictionary of the second table column;
adding the inferred predicate to the join condition based on the first column dictionary of the first table column and the second column dictionary of the second table column to modify the query;
determining a cost of using the inferred predicate to perform the join operation of the modified query;
determining a plurality of query execution plans to execute the join operation of the modified query using the inferred predicate;
determining a cost of each of the plurality of query execution plans based on the cost of using the inferred predicate to perform the join operation of the modified query; and
selecting one of the plurality of query execution plans to execute the query based on the determined costs of each of the plurality of query execution plans.

9. The method according to claim 1, the inferred predicate restricting the join operation of the modified query to values of the first table column which are present in both the first column dictionary and the second column dictionary, and to values of the second table column which are present in both the first column dictionary and the second column dictionary.

10. The method according to claim 9, wherein determination of the cost of using the inferred predicate to perform the join operation of the modified query comprises determination of a cost to determine values which are present in both the first column dictionary and the second column dictionary.

11. The method according to claim 9, the processing unit to execute the processor-executable program code in order to cause the system to:
 determine a number of duplicates per value in the first table based on a cardinality of the first table and the number of values in the first column dictionary;
 determine a number of duplicates per value in the second table based on a cardinality of the second table and the number of values in the second column dictionary; and
 predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

12. The method according to claim 8, wherein determination of the cost of using the inferred predicate to perform the join operation of the modified query comprises determination of a cost to determine values which are present in both the first column dictionary and the second column dictionary.

13. The method according to claim 8, the processing unit to execute the processor-executable program code in order to cause the system to:
 determine a number of duplicates per value in the first table based on a cardinality of the first table and the number of values in the first column dictionary;
 determine a number of duplicates per value in the second table based on a cardinality of the second table and the number of values in the second column dictionary; and
 predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

14. The method according to claim 8, the processing unit to execute the processor-executable program code in order to cause the system to:
 determine a selectivity of the inferred predicate based on a number of values which are present in both the first column dictionary and the second column dictionary, a number of values in the first column dictionary, and a number of values in the second column dictionary.

15. A non-transitory medium storing processor-executable program code, the program code executable by a computing system to cause the computing system to:
 receive a query comprising a join operation on a first table and a second table and a join condition associated with the join operation;
 determine a first table column of the first table and a second table column of the second table associated with the join condition;
 determine an inferred predicate of the query, the inferred predicate associated with a first column dictionary of the first table column and a second column dictionary of the second table column;
 add the inferred predicate to the join condition based on the first column dictionary of the first table column and the second column dictionary of the second table column to modify the query;
 determine a cost of using the inferred predicate to perform the join operation of the modified query;
 determine a plurality of query execution plans to execute the join operation of the modified query using the inferred predicate; and
 determine a cost of each of the plurality of query execution plans based on the cost of using the inferred predicate to perform the join operation of the modified query.

16. The medium according to claim 15, the inferred predicate restricting the join operation of the modified query to values of the first table column which are present in both the first column dictionary and the second column dictionary, and to values of the second table column which are present in both the first column dictionary and the second column dictionary.

17. The medium according to claim 16, wherein determination of the cost of using the inferred predicate to perform the join operation of the modified query comprises determination of a cost to determine values which are present in both the first column dictionary and the second column dictionary.

18. The medium according to claim 16, the program code executable by a computing system to cause the computing system to:
 determine a number of duplicates per value in the first table based on a cardinality of the first table and the number of values in the first column dictionary;
 determine a number of duplicates per value in the second table based on a cardinality of the second table and the number of values in the second column dictionary; and
 predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

19. The medium according to claim 15, wherein determination of the cost of using the inferred predicate to perform the join operation of the modified query comprises determination of a cost to determine values which are present in both the first column dictionary and the second column dictionary.

20. The medium according to claim 15, the program code executable by a computing system to cause the computing system to:
 determine a number of duplicates per value in the first table based on a cardinality of the first table and the number of values in the first column dictionary;
 determine a number of duplicates per value in the second table based on a cardinality of the second table and the number of values in the second column dictionary; and
 predict a number of rows output by the join operation of the modified query using the inferred predicate to perform the join operation of the modified query based on the number of duplicates per value in the first table, the number of duplicates per value in the second table, and the number of values which are present in both the first column dictionary and the second column dictionary.

* * * * *